United States Patent [19]

Allen

[11] Patent Number: 4,761,718

[45] Date of Patent: Aug. 2, 1988

[54] SIGNAL LIGHT FOR AUTOMOTIVE VEHICLE

[76] Inventor: Billie W. Allen, 296 La Plata NW., Alburquerque, N. Mex. 87107

[21] Appl. No.: 140,057

[22] Filed: Dec. 31, 1987

[51] Int. Cl.⁴ .............................................. B60Q 1/00
[52] U.S. Cl. ........................................ 362/80; 340/97; 362/270; 362/371
[58] Field of Search ...................... 340/79, 97; 362/61, 362/80, 270, 285, 371

[56] References Cited

U.S. PATENT DOCUMENTS 2,102,967  12/1937  Neel et al. ............................. 362/80
3,493,924   2/1970  Dobbins ................................ 340/97

Primary Examiner—Stephen F. Husar
Attorney, Agent, or Firm—Henderson & Sturm

[57] ABSTRACT

The inventive signal light structure includes a fore-and-aft track mounted atop the dash of a vehicle and extending back from the windshield to a rear part of the dash, plus a lamp housing mounted on the track for fore-and-aft sliding between front and rear positions. A hinge on a transverse axis is included in the track follower so that the housing may be tilted rearwardly and downwardly when it attains its rear position, thus disposing the housing in an out-of-the-way mode.

3 Claims, 1 Drawing Sheet

U.S. Patent  Aug. 2, 1988  4,761,718
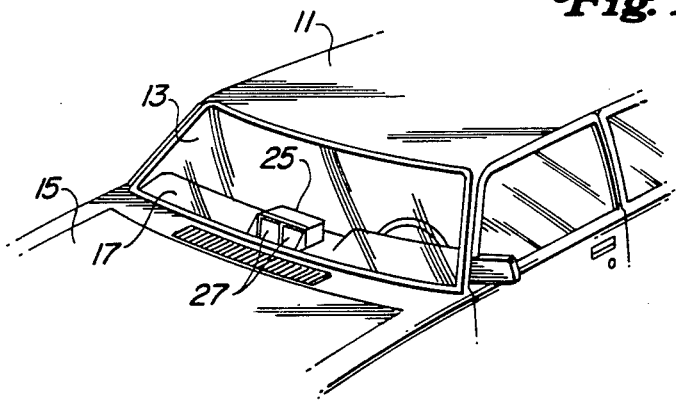
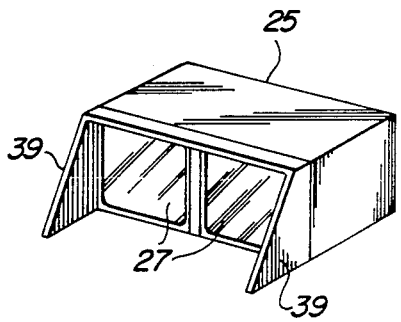
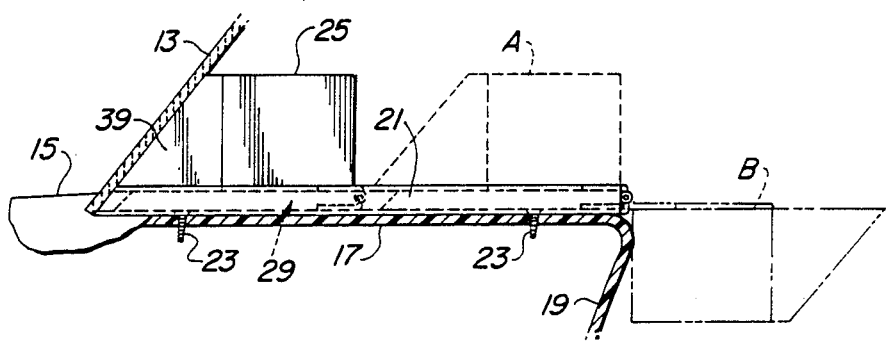
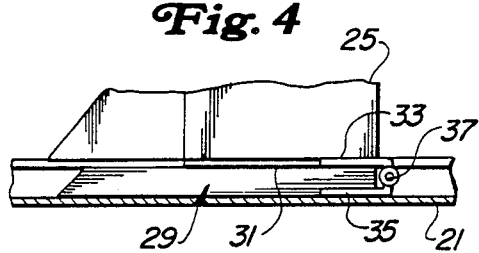
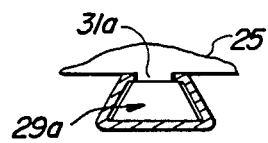
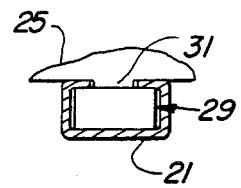

SIGNAL LIGHT FOR AUTOMOTIVE VEHICLE

BACKGROUND AND SUMMARY OF THE INVENTION

Signal lights for emergency, police, ambulance and like vehicles are of course well known. Among the various forms of these are the roof-mounted so-called gumdrop, hood-mounted flashers, rear-window-mounted flashers, etc. The "gumdrop" type is very often characterized as a loose unit carried within the driver's compartment when not in use and placed on the roof by the driver when needed for emergency, signalling, etc. purposes. Whether operated by a self-contained battery or by the vehicle battery, such signalling lights have many disadvantages, including possible loss or damage, interference with the driver and require one form of means or another for temporary attachment to the vehicle roof.

According to the present invention, these and other disadvantages and short-comings are eliminated by the provision of a lamp housing that is carried by a fore-and-aft track on the vehicle dash for selective positioning between a forward position adjacent to the windshield and a rearward position retracted as respects the windshield. The housing is further mounted on a track follower via a hinge by means of which the housing may be tilted backwardly and downwardly to a position rendering the housing virtually concealed from exteriorly of the vehicle. The inventive structure features simplicity, ease of installation and use and a sturdy but low-cost design.

Further features and advantages of the invention will appear as a preferred embodiment of the invention is disclosed here.

DESCRIPTION OF THE DRAWINGS

FIG. 1 is a small-scale perspective of the front portion of a conventional automotive vehicle and shows the forward position of the inventive lamp housing.

FIG. 2 is a longitudinal section, on a larger scale, showing the structure and track, full lines showing the front position of the housing, dotted lines showing a rear position and dot-dash lines showing the downwardly and rearwardly tilted position or mode.

FIG. 3 is a perspective of the lamp housing per se.

FIG. 4 is an enlarged fragmentary section showing in greater detail the slide-mounting of the housing.

FIG. 5 is a transverse section showing one form of fore-and-aft track.

FIG. 6 is a similar section showing another form of track.

DETAILED DESCRIPTION OF A PREFERRED EMBODIMENT OF THE INVENTION

In FIG. 1, the numeral (11) denotes the front portion of a typical automotive vehicle having a windshield (13) and a hood (15) extending forwardly from the windshield. In FIG. 4 will be seen a conventional dash (17) that extends back from the windshield to a rear terminal portion (19).

The inventive structure includes a fore-and-aft track (21) which may be of any form, such as a rectangular type channel as seen in FIG. 5 or a tapered channel as seen at (21a) in FIG. 6. In any event, the length of the track is such that it extends from a front end adjacent to the windshield to a rear end adjacent to the rear part (19) of the dash. The track has means, such as screws (23), for affixation thereof to the top of the dash in the position just described. The track may be of any suitable material featuring long life, low cost and attractiveness so as to blend in with the vehicle's interior.

A further part of the structure is a lamp housing (25), here of box-like structure that may house any form of signalling means, such as lamps of different colors, etc. and these may be of the steady or flashing type selected from the wide variety of lamps, flashers, etc. available. These details are not shown because of the variety of the types that may be used. In the present case, the housing has a front fact divided into two panels (27) plus an interior partition (not shown) for the purpose of containing lamps of different types, colors, etc., details that again are not of a limiting character. The housing may be of any suitable material and of a color compatible with the vehicle interior.

The underside of the housing has affixed thereto a track follower (29) which follows the track (21). For the track (21a), the follower is designated (20a). The follower includes a slide (31), (31a) which fits the track and a top leaf (33) affixed to the under side of the housing plus a lower leaf (35) affixed to the slide. The two leaves are joined by a hinge pin (37) on a transverse axis, an arrangement that enables rearward and downward tilting or "folding" of the housing after it reaches its rear position. This is best illustrated in FIG. 4 where the rear position is shown at A (dotted lines) and the "folded" position at B (dot-dash lines). When in position B, the unit is virtually concealed from at least remotely located vehicles, on-lookers, etc.

As a further adjunct to the invention, the front face portion of the housing is provided with shade or screen portions (39) configured to conform to the back or interior face of the windshield. These are for the purpose of eliminating or at least minimizing reflective glare when the lamps, flashers, etc. are operative.

The wiring for the unit is not shown, since, like the types of lamps, flashers, etc., it may be selected from a wide variety of hook-ups that may be chosen for the particular purposes of the user. Further features and advantages of the inveniton, in addition to those pointed out herein, will occur to those versed in the art, as will many modifications and alterations in the preferred emobidment disclosed, all without departing from the spirit and scope of the invention.

I claim:

1. For use in a vehicle having a windshield and a dash member extending generally horizontally back from the windshield to a terminal rear portion: a signal light attachment structure comprising a fore-and-aft track having means for affixation to the top of the dash to extend from the windshield to the rear portion of the dash, a signal lamp housing disposed above the track and having a front signalling face facing the back side of the windshield, and a track follower means secured to the housing and received by the track for fore-and-aft sliding of the housing between a front position adjacent to the windshield and a rear position adjacent to the rear portion of the dash.

2. The attachment structure according to claim 1, in which the track follower includes a slide in the track and a hinge on a transverse axis connecting the slide to the housing for enabling rearward and downward tilting of the housing when it attains its rear position.

3. The attachment structure according to claim 1, in which the housing includes forward and downwardly sloped projections configured to fit against the back side of the windshield.

* * * * *